United States Patent
Aggarwal et al.

(10) Patent No.: US 11,683,851 B2
(45) Date of Patent: Jun. 20, 2023

(54) MULTI-USIM SUSPENSION AND OPTIMIZED RESUMPTION

(71) Applicant: QUALCOMM Incorporated, San Diego, CA (US)

(72) Inventors: Rajat Aggarwal, Telangana (IN); Mayank Arora, Telangana (IN); Priya Rajan, Hillsborough, NJ (US); Ravneet Singh, Telangana (IN); Amar Kumar Nandan, Telangana (IN)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/202,206

(22) Filed: Mar. 15, 2021

(65) Prior Publication Data
US 2022/0295591 A1 Sep. 15, 2022

(51) Int. Cl.
*H04W 76/27* (2018.01)
*H04W 76/30* (2018.01)
*H04W 8/18* (2009.01)
*H04W 28/02* (2009.01)
*H04W 74/08* (2009.01)

(52) U.S. Cl.
CPC .......... *H04W 76/27* (2018.02); *H04W 8/183* (2013.01); *H04W 28/0278* (2013.01); *H04W 74/0833* (2013.01); *H04W 76/30* (2018.02)

(58) Field of Classification Search
None
See application file for complete search history.

(56) References Cited

U.S. PATENT DOCUMENTS

| | | | |
|---|---|---|---|
| 2011/0077003 A1* | 3/2011 | Shin | H04W 48/16 455/434 |
| 2014/0119345 A1* | 5/2014 | Sikh | H04W 72/12 370/336 |
| 2014/0120925 A1* | 5/2014 | Kanthala | H04W 72/04 455/450 |
| 2014/0128082 A1* | 5/2014 | Chirayil | H04W 68/02 455/438 |
| 2018/0139778 A1* | 5/2018 | Chou | H04W 74/006 |
| 2018/0270894 A1* | 9/2018 | Park | H04W 76/14 |
| 2019/0261411 A1* | 8/2019 | Chin | H04W 74/0833 |

(Continued)

FOREIGN PATENT DOCUMENTS

| | | | |
|---|---|---|---|
| WO | WO-2018031603 A1 * | 2/2018 | H04W 36/08 |
| WO | 2021033586 A1 | 2/2021 | |

(Continued)

OTHER PUBLICATIONS

International Search Report and Written Opinion—PCT/US2021/044073—ISA/EPO—dated Apr. 7, 2022.

(Continued)

*Primary Examiner* — Jamaal Henson
(74) *Attorney, Agent, or Firm* — Haynes and Boone LLP

(57) ABSTRACT

A suspension and optimized resumption is provided for a multi-USIM UE. The UE is configured to transmit a suspension-triggering message to a first network to begin a transition of a first USIM from an RRC_CONNECTED state to an RRC_IDLE state. A contention-free random access procedure is also disclosed for the optimized resumption of the first USIM from the RRC_IDLE state back to the RRC_CONNECTED state.

23 Claims, 7 Drawing Sheets

(56) References Cited

U.S. PATENT DOCUMENTS

| | | | |
|---|---|---|---|
| 2020/0336891 A1* | 10/2020 | Guo | H04W 76/34 |
| 2021/0120524 A1* | 4/2021 | Palle | H04W 68/005 |
| 2021/0212155 A1* | 7/2021 | Huang-Fu | H04W 76/27 |
| 2021/0410180 A1* | 12/2021 | Tsai | H04W 76/30 |
| 2022/0191778 A1* | 6/2022 | Kumar | H04W 36/14 |
| 2022/0225465 A1* | 7/2022 | Xu | H04W 24/02 |
| 2022/0256640 A1* | 8/2022 | Zhang | H04W 76/27 |
| 2022/0264589 A1* | 8/2022 | Sun | H04W 72/535 |
| 2022/0272761 A1* | 8/2022 | Park | H04W 74/0833 |

FOREIGN PATENT DOCUMENTS

| | | | |
|---|---|---|---|
| WO | 2021043417 A1 | 3/2021 | |
| WO | 2021090179 A1 | 5/2021 | |
| WO | 2021113581 A1 | 6/2021 | |
| WO | WO-2021113581 A1 * | 6/2021 | |
| WO | 2022006809 A1 | 1/2022 | |

OTHER PUBLICATIONS

Nokia., et al., "Multiple UL SPS Configuration Collision Handling", 3GPP Draft, R2-1708592_ Multiple UL SPS Configuration Collision Handling, 3GPP TSG RAN WG1 Ad-Hoc Meeting 1901, R1-1900706, Discussion on HARQ Enhancements in NR-U, 3rd Generation Partnership Project (3GPP), Mobile Competence Centre, 650, Route Des Lucioles, F-06921 Sophia-Antipolis Cedex, France, RAN WG2, No. Berlin, Germany, Aug. 21, 2017-Aug. 25, 2017, Aug. 20, 2017 (Aug. 20, 2017), 3 Pages, XP051318439, Retrieved from the Internet: URL: http://www.3gpp.org/ftp/Meetings_3GPP_SYNC/RAN2/Docs/[retrieved on Aug. 20, 2017], Section 3, p. 1, figure 1.

Qualcomm: "Remaining Issues on DL SPS for URLLC", 3GPP Draft, R1-2002549, 3GPP TSG RAN WG1 #100b, e-Meeting, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020 (Apr. 11, 2020), XP051875663, 4 Pages, Retrieved from the Internet: URL: https://ftp.3gpp.org/tsg_ran/WG1_RL1/TSGR1_100b_e/Docs/R1-2002549.zip R1-2002549 Remaining Issues on DL SPS for URLLC.docx [retrieved on Apr. 11, 2020] pp. 3, 4, Section 3.

International Search Report and Written Opinion—PCT/US2022/016491—ISA/EPO—dated May 13, 2022.

\* cited by examiner

```
SuspendConfig ::=        SEQUENCE {
    fulll-RNTI              I-RNTI-Value,
    shortI-RNTI             ShortI-RNTI-Value,
    ran-PagingCycle         PagingCycle,
    ran-NotificationAreaInfo RAN-NotificationAreaInfo            OPTIONAL, -- Need M
    t380                    PeriodicRNAU-TimerValue              OPTIONAL, -- Need R
    nextHopChainingCount    NextHopChainingCount,
    rach-ConfigDedicated    RACH-ConfigDedicated                 OPTIONAL,
    ...
}
```

MULTI-USIM SUSPENSION AND OPTIMIZED RESUMPTION

TECHNICAL FIELD

The technology discussed below relates generally to wireless communication systems, and more particularly, to a technique for suspension and optimized resumption for a device with more than one universal subscriber identity module (USIM).

BACKGROUND

To access a next generation new radio (NR) network, a network device such as a cellular telephone typically requires a universal subscriber identity module (USIM) card. The USIM card includes an integrated circuit that encrypts communication and also identifies the network device to the service provider for the accessed network. A USIM card is thus fundamental for network access. But it is advantageous for a network device to include more than one USIM card. For example, one USIM card may be used for work purposes to access a first network whereas another USIM card may be used for personal use to access a second network. In addition, including more than one USIM card per network device enhances the ability to access foreign networks during travel.

Although incorporating multiple USIM cards is advantageous, it would consume substantial power if a network device was in an active Radio Resource Control (RRC) state for the corresponding multiple networks. It is thus conventional that a multiple USIM device be in an active RRC state through a first USIM card while it is in an RRC idle state through a second USIM card. But even though a network device may be in an RRC idle state for a given USIM card, there still needs to be an ability to receive paging messages to the idled USIM card. In addition, the network device may need to support emergency calls for the idled USIM card.

SUMMARY

In accordance with a first aspect of the disclosure, a method of wireless communication for a multiple universal subscriber identity module (USIM) user equipment is provided that includes: transmitting a suspension-triggering message to a first network; in response to the transmission of the suspension-triggering message, receiving a Release message to cause a first USIM in the user equipment to transition from a first RRC_CONNECTED state to an RRC_INACTIVE state, the Release message identifying a random-access preamble to the user equipment; in response to a transition of a second USIM in the user equipment from an RRC_CONNECTED state into an RRC_IDLE state with respect to a second network, transmitting the random-access preamble to the first network; and in response to the transmission of the random-access preamble to the first network, receiving a Random Access Response to cause the first USIM to transition from the RRC_INACTIVE state to a second RRC_CONNECTED state with the first network.

In accordance with a second aspect of the disclosure, a method of wireless communication for a multiple universal subscriber identity module (USIM) user equipment, comprising: transmitting a suspension-triggering message to a first network while a first USIM in the user equipment operates in a first cell of the first network; in response to the transmission of the suspension-triggering message, receiving a Release message to cause the first USIM in the user equipment to transition from a first RRC_CONNECTED state to an RRC_INACTIVE state; in response to a transition of a second USIM in the user equipment from an RRC_CONNECTED state into an RRC_IDLE state with respect to a second network, performing a Radio Resource Control (RRC) Resume procedure between the first USIM and the first network that includes a contention-based random access of the first USIM to a second cell of the first network; and transitioning the first USIM from the RRC_IDLE state back into a second RRC_CONNECTED state with the first network responsive to a performance of the RRC Resume procedure.

In accordance with a third aspect of the disclosure, a method of wireless communication for a base station is provided that includes: receiving a suspension-triggering message from a multiple universal subscriber identity module (USIM) user equipment; in response to the receiving of the suspension-triggering message, transmitting a Release message to a first USIM to cause the first USIM to transition from a first RRC_CONNECTED state to an RRC_INACTIVE state, the Release message identifying a random-access preamble to the user equipment; receiving the random-access preamble from the user equipment; and in response to the receiving of the random-access preamble, transmitting a Random Access Response to the first USIM to cause the first USIM to transition from the RRC_INACTIVE state to a second RRC_CONNECTED state.

In accordance with a fourth aspect of the disclosure, a user equipment is provided that includes: a first universal subscriber identity module (USIM) configured to associate with a first network; a second USIM configured to associate with a second network; a transceiver; and a processor configured to: command the transceiver to transmit a suspension-triggering message to the first network; transition the first USIM from a first RRC_CONNECTED state in the first network to an RRC_INACTIVE state in response to a receipt at the transceiver of a Release message; identify a random-access preamble from the Release message; transition the second USIM in the user equipment from an RRC_CONNECTED in the second network into an RRC_IDLE state, in response to the transition of the second USIM, command the transceiver to transmit the random-access preamble to the first network; and transition the first USIM from the RRC_INACTIVE state to a second RRC_CONNECTED state in the first network in response to a receipt at the transceiver of a Random Access Response from the first network.

These and other aspects of the disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5 is an abstract syntax notation representation of the SuspendConfig message of FIG. 3 in accordance with an aspect of the disclosure.

DETAILED DESCRIPTION

A solution for suspension (or release) of a network connection through a first USIM card in a multiple-USIM card user equipment (UE) is provided so that the UE may temporarily leave a first network associated with a first USIM card and access a second network associated with a second USIM card. An optimized resumption of activity with the first network follows the temporary connection to the second network. The suspension of activity and optimized resumption with the first network is network-controlled, which is quite advantageous as compared to the UE autonomously leaving the first network. Should the UE autonomously leave the first network, the abrupt departure is likely to be interpreted as an error case by the first network, which has the potential to distort the first network's statistics and misguide algorithms that rely on the statistics. In addition, the first network may then waste paging resources by paging the UE due to the autonomous release by the UE. But these issues are solved by the network-controlled suspension and resumption of activity disclosed herein. For brevity, a USIM card is also referred to herein as a USIM.

To provide a better appreciation of the disclosed multiple-USIM techniques, some basis concepts in NR networks will first be discussed including the following definitions:

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Refers to fifth generation (5G) technologies and the new radio access technology undergoing definition and standardization by the 3$^{rd}$ Generation Partnership Project (3GPP).

DCI: downlink control information. A set of information transmitted at the physical (L1) Layer that, among other things, schedules the downlink data channel (e.g., the physical downlink shared channel (PDSCH)) or the uplink data channel (e.g., the physical uplink shared channel (PUSCH)).

MAC-CE: media access control-control element. A MAC structure used for carrying MAC layer control information between a gNodeB (gNB) and a UE. The structure may be implemented as a special bit string in a logical channel ID (LCID) field of a MAC Header.

Figure 1:
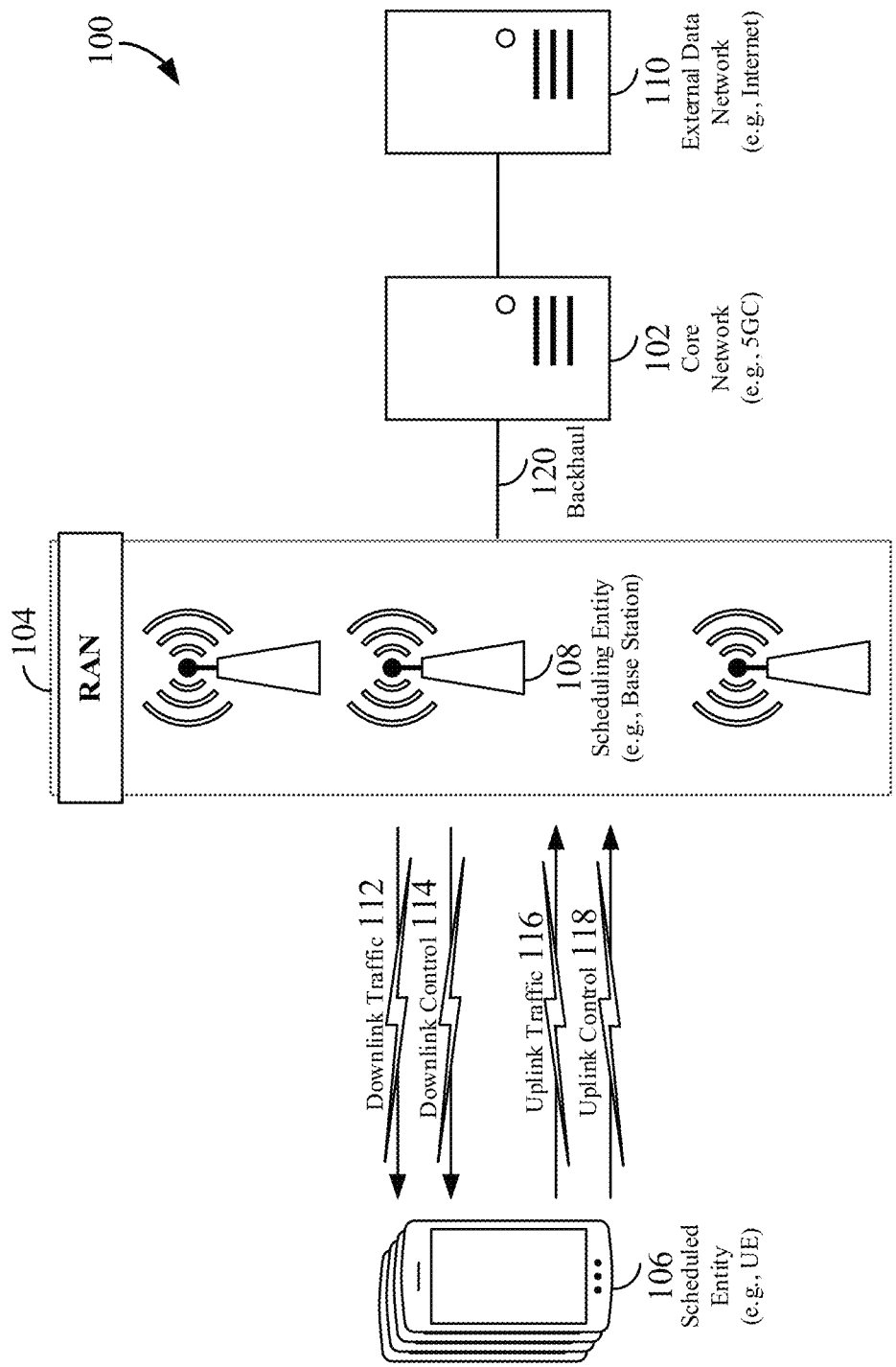
FIG. 1 is a schematic illustration of a wireless communication system with multiple USIM suspension and optimized resumption in accordance with an aspect of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a plurality of user equipment (UE) 106. By virtue of the wireless communication system 100, each UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Each base station 108 is responsible for radio transmission and reception in one or more cells. In different technologies, standards, or contexts, a base station 108 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a network device, or some other suitable terminology. Each UE 106 may be an apparatus that provides a user with access to network services.

Transmissions over the air interface from a base station 108 to one or more UEs 106 may be referred to as downlink (DL) transmissions. Transmissions from a UE 106 to a base station 108 may be referred to as uplink (UL) transmissions. As illustrated in FIG. 1, a base station 108 may broadcast downlink traffic 112 to one or more UEs 106. Each base station 108 is a node or device responsible for scheduling the downlink traffic 112 and, in some examples, uplink traffic 116 from the one or more UEs 106. On the other hand, each UE 106 is a node or device that receives downlink control information 114, including but not limited to scheduling information, synchronization or timing information, or other control information from a base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In a network configured for UL-based mobility, UL reference signals from each UE 106 may be utilized by the network 104 to select a serving cell for each UE 106. In some examples, the base stations 108 may broadcast unified synchronization signals (e.g., unified Primary Synchronization Signals (PSSs), unified Secondary Synchronization Signals (SSSs) and unified Physical Broadcast Channels (PBCH)). The UEs 106 may receive the unified synchronization signals, derive the carrier frequency and slot timing from the synchronization signals, and in response to deriving timing, transmit an uplink pilot or reference signal. The uplink pilot signal transmitted by a UE 106 may be concurrently received by two or more cells each having its own base station 108 within the radio access network 104. Each cell may measure a strength of the pilot signal, and the radio access network 104 may then determine a serving cell for the UE 106. As each UE 106 travels through a cell, the radio access network 104 may continue to monitor the uplink pilot signal transmitted by the UE 106. When the signal strength or quality of the pilot signal measured by a neighboring cell exceeds that of the signal strength or quality measured by the serving cell, the radio access network 104 may handover the UE 106 from the serving cell to a neighboring cell, with or without informing the UE 106.

Figure 2:
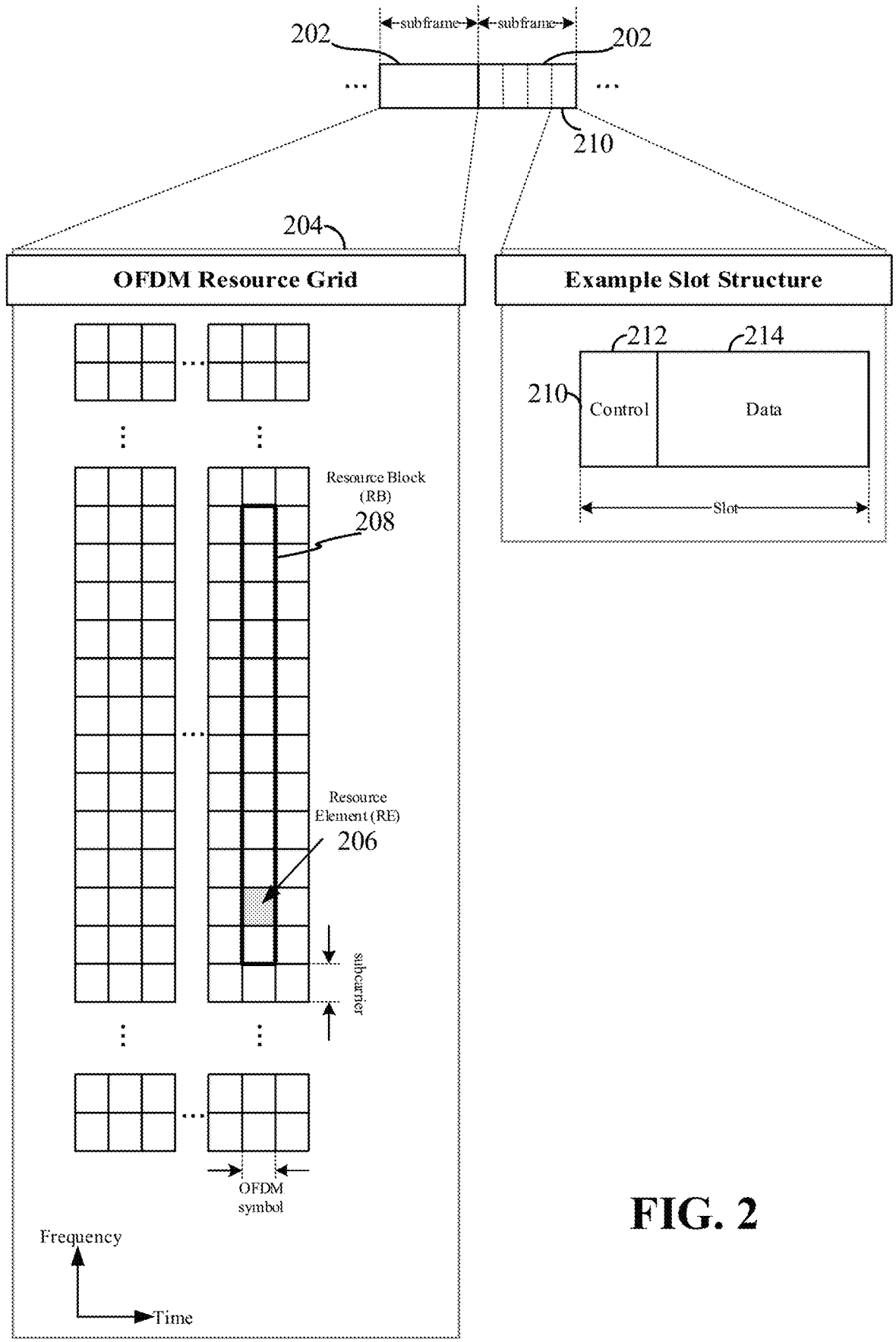
FIG. 2 is a schematic illustration of an organization of wireless resources utilizing orthogonal frequency divisional multiplexing (OFDM) for the wireless communication system of FIG. 1.

Various aspects of the present disclosure will be described with reference to an OFDM waveform, schematically illustrated in FIG. 2. Within the present disclosure, a frame refers to a duration of 10 ms for wireless transmissions, with each frame consisting of 10 subframes of 1 ms each. On a given carrier, there may be one set of frames in the UL, and another set of frames in the DL. An expanded view of an exemplary DL subframe 202 is also illustrated in FIG. 2, showing an OFDM resource grid 204. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 204 may be used to schematically represent time-frequency resources for a given antenna port. That is, in a MIMO implementation with multiple antenna ports available, a corresponding multiple number of resource grids 204 may be available for communication. The resource grid 204 is divided into multiple resource elements (REs) 206. An RE 206, which is 1 subcarrier×1 symbol, is the smallest discrete part of the time-frequency grid, and contains a single complex value representing data from a physical channel or signal. A block of twelve consecutive subcarriers defined a resource block (RB) 208, which has an undefined time duration in the NR standard. In FIG. 2, resource block 208 extends over a symbol duration. Within the present disclosure, it is assumed that a single RB such as the RB 208 entirely corresponds to a single direction of communication (either transmission or reception for a given device). A set of contiguous RBs 208 such as shown for resource grid 404 form a bandwidth part (BWP).

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of a slot 210 illustrates a control region 212 and a data region 214. In general, the control region 212 may carry control channels (e.g., PDCCH), and the data region 214 may carry data channels (e.g., PDCCH or PUSCH). A slot 210 may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 208.

Given this preliminary discussion, some exemplary implementations for suspension and optimized resumption for a multiple-USIM-configured UE will now be discussed in more detail.

Exemplary Implementations for Suspension and Optimized Resumption for a Multiple-USIM-Configured UE A multiple-USIM-configured UE may communicate through a plurality of radio access networks depending upon which USIM is active. With regard to the radio access network (RAN) connection through any one of its USIMs, a multiple-USIM-configured UE may be in one of three radio resource control (RRC) states: RRC_IDLE, RRC_INACTIVE, or RRC_CONNECTED. For brevity, these RRC states will also be referred to as the idle, inactive, and connected states, respectively. In the idle state, the UE does not have any RRC context. The RRC context covers all the parameters required for communication between the UE and the RAN. There is thus no data transfer to a UE from the RAN associated with the idle USIM. In the inactive state, there is also no data transfer but the RRC context is retained. In the connected state, data transfer is possible. The RRC context and RAN network connection are both maintained in the connected state.

The UE is in the active state with respect to only one USIM at any given time. Prior to the suspension and optimized resumption, the UE is in the idle state for any remaining USIMs. The following discussion will be directed to a UE with two USIMs, but it will be appreciated that a greater number of USIMs may also be used in alternative implementations. In addition, the term "network" without further qualification will be understood herein to refer to a radio access network. In addition, the USIM card through which the UE is the RRC_CONNECTED state will be referred to as the connected USIM. Similarly, a USIM through which the UE is in the RRC_IDLE state will be referred to as an idle USIM. Finally, a USIM through which the UE is in the RRC_INACTIVE state will be referred to as an inactive USIM.

In response to a triggering event such as an incoming paging message to the inactive USIM, the UE triggers a suspension of the RRC_CONNECTED state for the connected USIM through a suspension-triggering message sent to the base station. An example suspension-triggering message is a modified UEAssistanceInformation message, but it will be appreciated that other messages may be modified to include the suspension-triggering message. Alternatively, the suspension-triggering message may be an entirely new message in the 5G protocol as opposed to a modification of an existing message.

As known in the 5G arts, the UEAssistanceInformation message is used for a number of purposes, including the incrementing or decrementing of the delay budget for the discontinuous reception (DRX) cycle and for overheating messaging. In some embodiments, the UEAssistanceInformation message may include an inactive information element to signal to the RAN that the UE would like to be transitioned to the RRC_INACTIVE state. In other words, if the inactive flag is asserted (it being true), then the active USIM should be suspended (transitioned from RRC_CONNECTED to RRC_INACTIVE). Conversely, if the inactive flag is de-asserted (it being false), then no change is being requested for the status of the active USIM.

In response to the RAN's base station receiving the suspension-triggering message, the RAN for the connected USIM transitions the connected USIM to the inactive state. In general, the transition of a UE and USIM from the RRC-CONNECTED to the RRC_INACTIVE state is a known procedure in the 5G arts and is denoted as an RRC connection release. In one embodiment, the RAN may perform a conventional RRC connection release in response to the receipt of the suspension-triggering message at the base station. But a conventional RRC release requires an RRC resume procedure in a subsequent transition of the just-idled UE/USIM combination to the connected state. To avoid the delay of such a conventional RRC resume procedure, a modified RRC connection release is disclosed herein in which the RAN provides a random-access preamble to the UE. The random-access preamble may also be denoted as the Physical Random Access Channel (PRACH). In some embodiments, the network transmits the random-access preamble using an information element within a modified SuspendConfig message. In a conventional RRC release, the base station transmits the SuspendConfig message to transition a connected UE to the inactive state. Thus, the UE responds to the modified SuspendConfig message to transition its connected USIM to the inactive state. But the modified SuspendConfig message disclosed herein also includes a new information element such as a RACH-ConfigDedicated message. The RACH-ConfigDedicated message is conventionally used during a CFRA handoff procedure. The RACH-ConfigDedicated message thus includes a CFRA field for the random-access preamble.

Modifying the SuspendConfig message to also include the RACH-ConfigDedicated field is quite advantageous in providing an optimized resumption of the UE from the inactive state to the connected state because the inactive USIM may use the random-access preamble for a CFRA resumption from the idle state to the connected state instead of resuming the connected state through a conventional RRC Resume procedure.

During a subsequent transition of the inactivated UE/USIM combination to the connected state, the UE may respond with the random-access preamble that was provided in the RACH-ConfigDedicated message. The RAN may then respond with a Random Access Response (RAR) message that provides an uplink grant for a buffer status report (BSR) from the UE. The transition for the recently-idled UE/USIM combination is thus a two-step contention-free random access (CFRA) procedure in that the UE may respond to the RAR by moving to the RRC_CONNECTED state and transmit a BSR such as over the Physical Uplink Shared Channel (PUSCH) to the base station.

In the preceding optimized resumption of the RRC_CONNECTED state for the inactivated UE/USIM combination, both the UE and the base station/RAN do not release the default MAC Cell Group Configuration. Note that this optimized resumption assumes that the same cell is being selected. In other words, the cell does not change from the suspension of the RRC_Connected state to the optimized resumption of the RRC_Connected state. Should the UE be changing its cell in the resumption to the RRC_Connected state, a conventional RRC resume procedure may be used.

Figure 3:
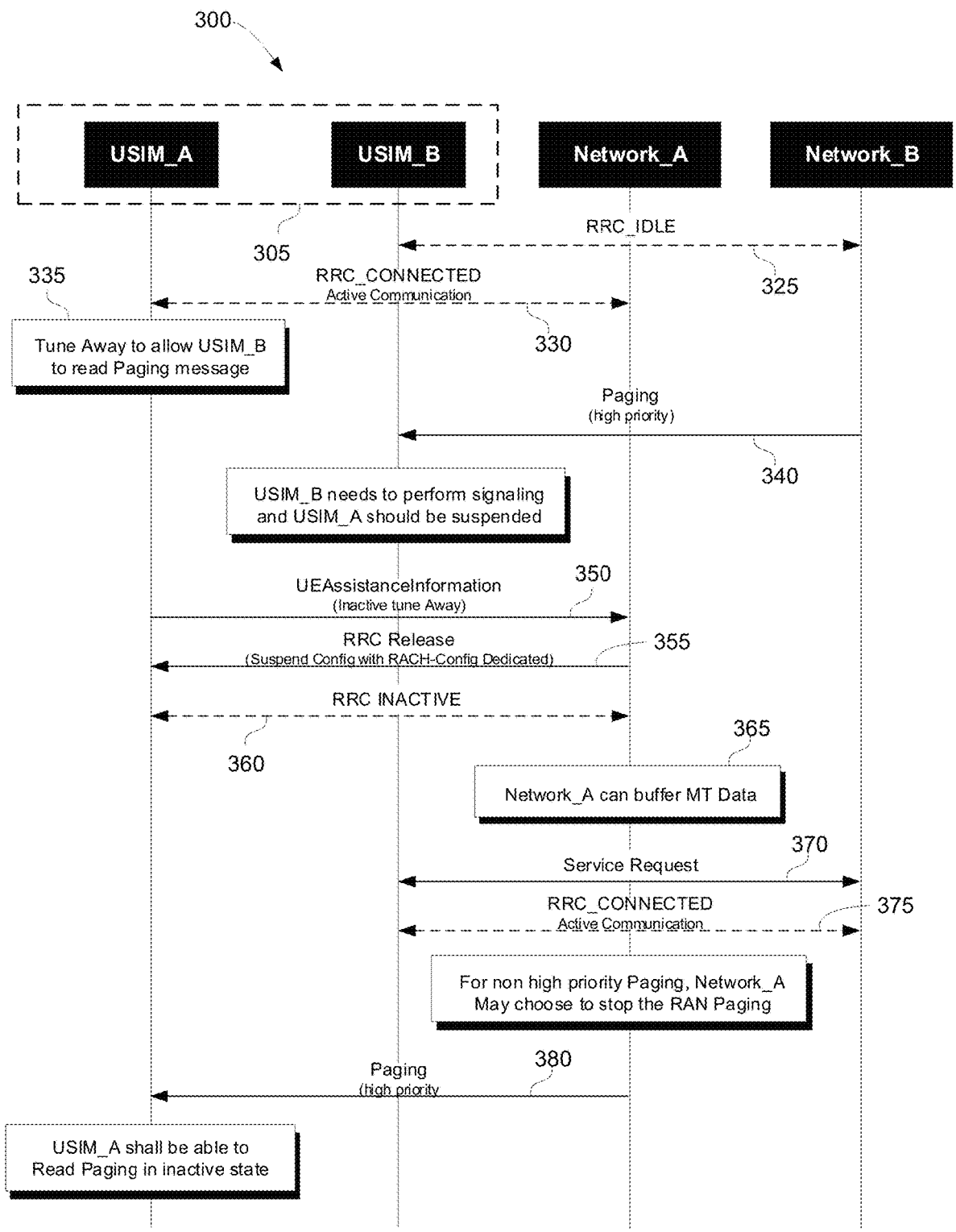
FIG. 3 is a call flow for the suspension of a first USIM in a multiple USIM UE in accordance with an aspect of the disclosure.

Some example call flows will now be discussed. A call flow 300 for the USIM suspension procedure is shown in FIG. 3. A UE 305 includes both a USIM_A and a USIM_B. Through USIM_A, UE 305 is initially in an RRC_CONNECTED state 330 supporting active communication with a network_A (as noted earlier, the term "network" without further clarification such as in this instance is referring herein to a RAN). At the same time, UE 305 is in an RRC_IDLE state 325 with a network_B. In the RRC_IDLE state 325 through USIM_B, UE 305 will periodically check for paging messages from network_B according to the UE's DRX cycle time. To allow this DRX-timed checking for paging messages from network_B, UE 305 performs a tune away procedure 335 to allow USIM_B to check for a paging message. Following tune away procedure 335, network_B indeed transmits a paging message (e.g., a high priority paging message) 340 to USIM_B. Upon the decoding of paging message 340, UE 335 determines a need to signal through USIM_B so that USIM_A should be suspended (transitioned from the RRC_CONNECTED STATE to the RRC_IDLE state).

Note that in the signaling between network_A and UE 305, UE 305 will transmit in the uplink to a base station for network_A. Similarly, UE 305 (when USIM_B becomes connected) will transmit in the uplink to a base station for network_B. The downlink signaling for these networks would also be performed by their respective base stations. In some embodiments, these base stations are distinct whereas the networks may share the same base station in other embodiments.

To begin the transition for USIM_A from the connected state to the idle state, UE 304 transmits a UEAssistanceInformation message 350 to network_A. In the UEAssistanceInformation message 350, the inactive flag is asserted. In response, network_A commands an RRC Release for USIM_A by transmitting to USIM_A a modified SuspendConfig message 355 that contains the RACH-ConfigDedicated IE that provides the random-access preamble for a subsequent optimized resumption of activity for USIM_A. In response to receiving the modified SuspendConfig message 355 at UE 305, USIM_A goes into an RRC_INACTIVE state 360. With USIM_A in the RRC_INACTIVE state, network_A may buffer mobile-terminated (MT) data that is addressed to USIM_A.

With USIM_A in the RRC_INACTIVE state, USIM_B may issue an RRC service request 370 to network_B. Network_B then transitions USIM_B to the RRC_CONNECTED state 375 so that USIM_B may engage in active communication with network_B in response to the paging message 340. While USIM_A is in the RRC_INACTIVE state, USIM_A may receive a paging message 380. In some embodiments, network_A may choose to skip non-priority paging of USIM_A while USIM_A is in the RRC_INACTIVE state such that paging message 380 is only transmitted to USIM_A if paging message 380 is a high-priority paging message.

Figure 4:
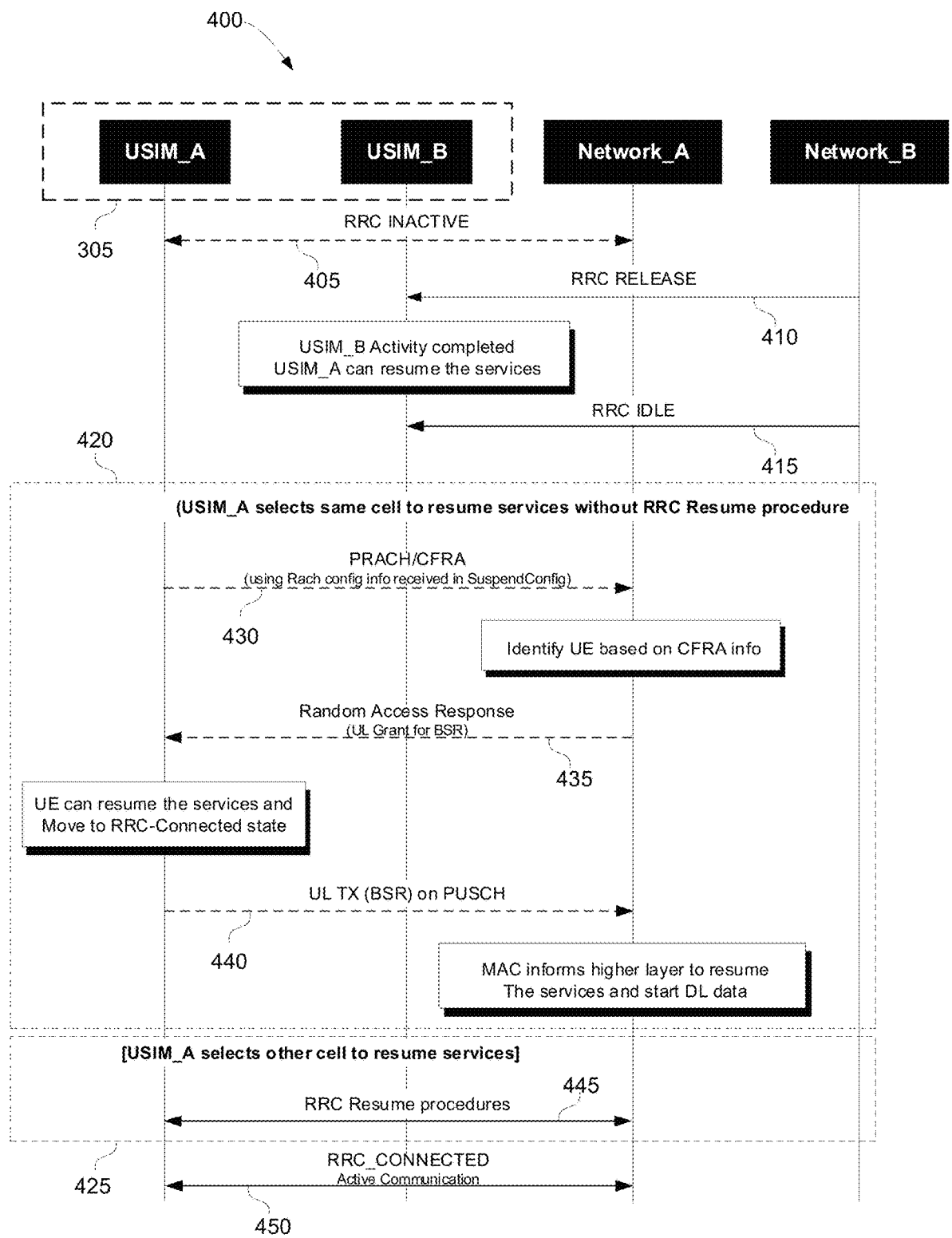
FIG. 4 is a call flow for the optimized resumption of the RRC_CONNECTED state for a first USIM in a multiple USIM UE in accordance with an aspect of the disclosure.

Turning now to FIG. 4, with the active communication completed between network_B and USIM_B, network_B may transmit an RRC Release command 410 to USIM_B as shown in the call flow 400 so that USIM_B may transition to the RRC_IDLE state 415 for an optimized resumption of an RRC_CONNECTED mode for USIM_A. This resumption may be with respect to the same cell as was used by USIM_A prior to the suspension to the inactive state as shown in a same-cell call flow 420 or may be to a different cell as shown in a different-cell call flow 425. In same-cell call flow 420, USIM_A transmits to the network_A the random-access preamble 430 (PRACH) that was previously identified in the RACH-ConfigDedicated message. USIM_A thus triggers a CFRA admission to network_A and receives from network_A a random access response (RAR) 435 that includes an UL grant for a buffer status request (BSR). In response to receiving RAR 435, UE 305 may resume network_A services through USIM_A, which is transitioned to the RRC_CONNECTED state. USIM_A then transmits an UL BSR 440 through the physical uplink shared channel (PUSCH) to network_A. The MAC layer in network_A then informs the higher layers in network_A to resume services for USIM_A and start the transmission of DL data.

In the different-cell call flow 425, USIM_A and network_A undergo a conventional RRC Resume procedure 445 to transition USIM_A to the RRC_CONNECTED state 450 so that active communication may occur for UE 305 through USIM_A with network_A.

An abstract syntax notation (ASN) for an exemplary modification of the SuspendConfig message is shown in FIG. 5. In one embodiment, this modification may be added to the 3GPP 5G NR Technical Specification (TS) 38.331, which is the TS directed to the RRC protocol. As shown in FIG. 5, a SuspendConfig message 500 is modified to include a RACH-ConfigDedicated field. This new field may contain a variety of subfields depending upon the implementation.

Figure 6:
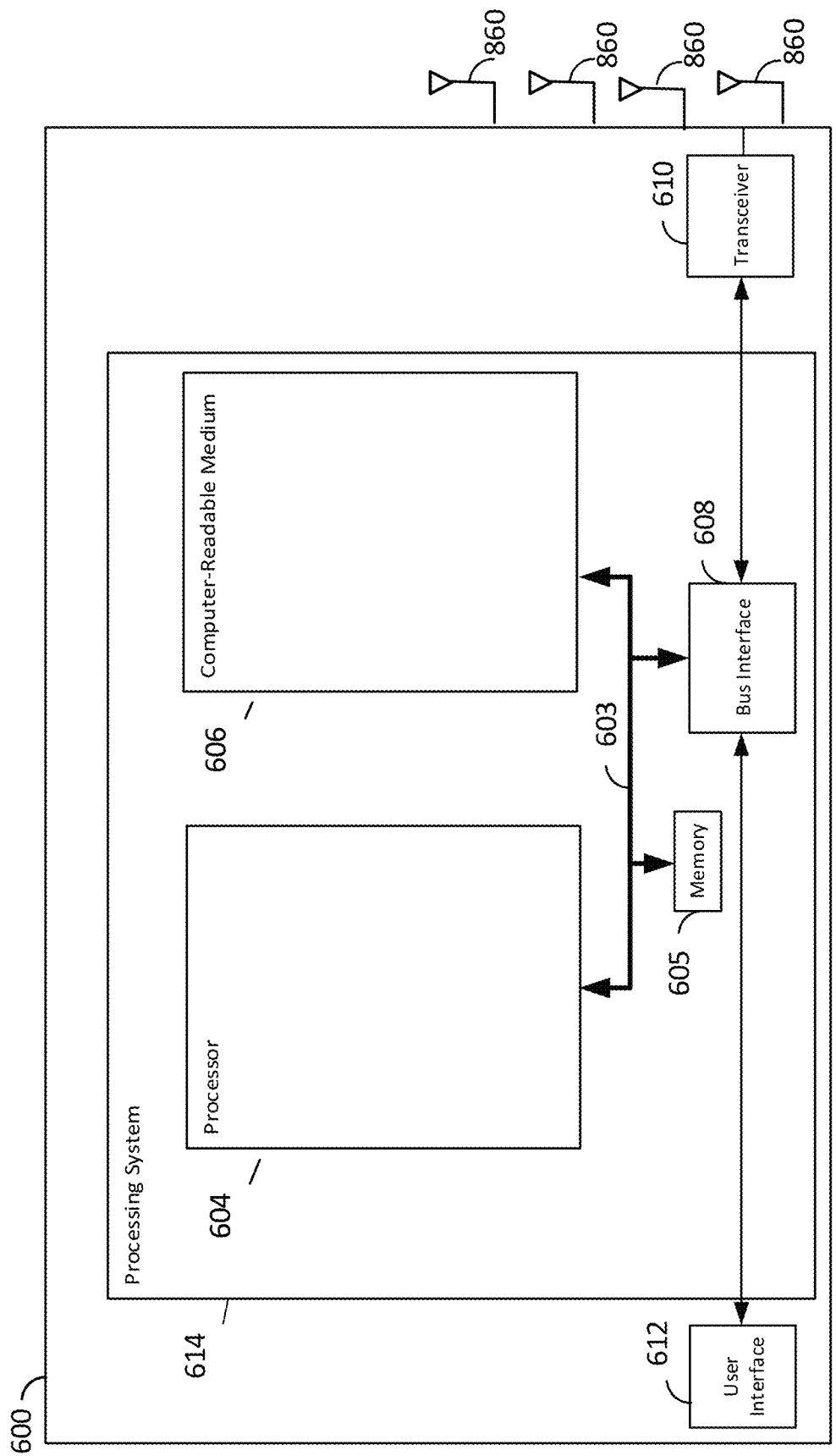
FIG. 6 illustrates an architecture for a network node in the system of FIG. 1 in accordance with an aspect of the disclosure.

A network node 600 is shown in FIG. 6 that is generic to a UE or a base station for the implementation of the enhanced suspension and optimized resumption disclosed herein. Network node 600 includes a processing system 614 having a bus interface 608, a bus 602, memory 605, a processor 604, and a computer-readable medium 606. Furthermore, node 600 may include a user interface 612 and a transceiver 610. Transceiver 610 transmits and receives through an array of antennas 660.

Processor 604 is also responsible for managing the bus 602 and general processing, including the execution of software stored on the computer-readable medium 606. The software, when executed by the processor 604, causes the processing system 614 to perform the enhanced suspension and optimized resumption disclosed herein. For example, should network node 600 represent a UE, processor 604 manages the UE-implemented call flow steps discussed with regard to FIGS. 3 and 4. Similarly, should network node 600 represent a base station, processor 604 manages the network-implemented call flow steps discussed with regard to FIGS. 3 and 4. The computer-readable medium 606 and the memory 605 may also be used for storing data that is manipulated by the processor 604 when executing software.

The bus 602 may include any number of interconnecting buses and bridges depending on the specific application of the processing system 614 and the overall design constraints. The bus 602 communicatively couples together various circuits including one or more processors (represented generally by the processor 604), the memory 605, and computer-readable media (represented generally by the computer-readable medium 606). The bus 602 may also link various other circuits such as timing sources, peripherals, voltage regulators, and power management circuits, which are well known in the art, and therefore, will not be described any further. The bus interface 608 provides an interface between the bus 602 and the transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided.

Figure 7:
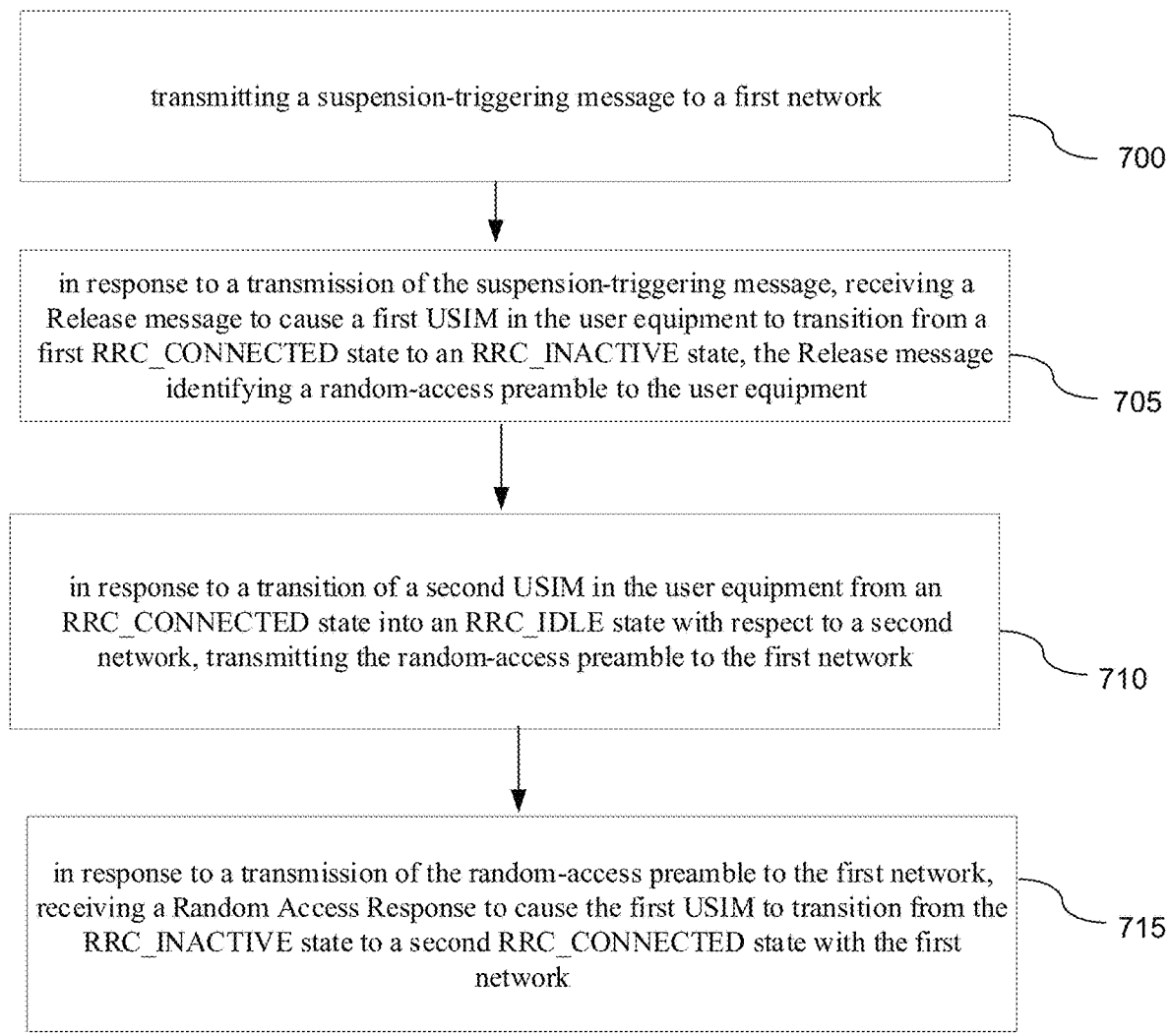
FIG. 7 is a flowchart for a USIM suspension and optimized resumption method for a multiple USIM UE in accordance with an aspect of the disclosure.

A method of operation for a multiple USIM UE will now be discussed with respect to the flowchart of FIG. 7. The method includes an act 700 of transmitting a suspension-triggering message to a first network. The transmission of the UEAssistanceInformation message 350 of FIG. 3 is an example of act 700. In addition, the method includes an act 705 that is in response to a transmission of the suspension-triggering message and includes receiving a Release message to cause a first USIM in the user equipment to transition from a first RRC_CONNECTED state to an RRC_INACTIVE state, the Release message identifying a random-access preamble to the user equipment. The receiving of the SuspendConfig message 355 and the transition to RRC_INACTIVE state 360 of FIG. 3 is an example of act 705. Furthermore, the method includes an act 710 that is in response to a transition of a second USIM in the user equipment from an RRC_CONNECTED state into an RRC_IDLE state with respect to a second network, transmitting the random-access preamble to the first network. The transmission of the PRACH 430 of FIG. 4 is an example of act 710. Finally, the method includes an act 715 that is in response to a transmission of the random-access preamble to the first network and includes receiving a Random Access Response to cause the first USIM to transition from the RRC_INACTIVE state to a second RRC_CONNECTED state with the first network. The receiving of the RAR 435 to cause the transition of USIM_A to the RRC_CONNECTED state is an example of act 715.

Some aspects of the preceding discussion will now be summarized in the following clauses.

Clause 1. A method of wireless communication for a multiple universal subscriber identity module (USIM) user equipment, comprising:
  transmitting a suspension-triggering message to a first network;
  in response to the transmission of the suspension-triggering message, receiving a Release message to cause a first USIM in the user equipment to transition from a first RRC_CONNECTED state to an RRC_INACTIVE state, the Release message identifying a random-access preamble to the user equipment;

in response to a transition of a second USIM in the user equipment from an RRC_CONNECTED state into an RRC_IDLE state with respect to a second network, transmitting the random-access preamble to the first network; and in response to the transmission of the random-access preamble to the first network, receiving a Random Access Response to cause the first USIM to transition from the RRC_INACTIVE state to a second RRC_CONNECTED state with the first network.

Clause 2. The method of clause 1, wherein the suspension-triggering message comprises a UEAssistanceInformation message.

Clause 3. The method of clause 2, wherein the UEAssistanceInformation message includes an inactive field.

Clause 4. The method of any of clauses 1-3, further comprising:

receiving a paging message to the second USIM prior to the transmission of the suspension-triggering message.

Clause 5. The method of clause 4, wherein the paging message is a high-priority paging message.

Clause 6. The method of any of clauses 4-5, further comprising:

while the second USIM is in the RRC_CONNECTED state, communicating with the second network in response to the paging message.

Clause 7. The method of any of clauses 1-6, wherein the Release message comprises a Radio Resource Control (RRC) Release message.

Clause 8. The method of clause 7, wherein the RRC Release message comprises a SuspendConfig message.

Clause 9. The method of clause 8, wherein the SuspendConfig message includes a RACH-ConfigDedicated field for identifying the random-access preamble.

Clause 10. The method of any of clauses 1-10, wherein the Random Access Response includes an uplink grant for a buffer status request from the user equipment, the method further comprising:

transmitting the buffer status request to the first network responsive to a transition of the first USIM from the RRC_INACTIVE state back to the second RRC_CONNECTED state.

Clause 11. The method of clause 10, wherein the transmitting the buffer status request to the first network comprises transmitting the buffer status request on a physical uplink shared channel.

Clause 12. The method of any of clauses 1-11, wherein the first RRC_CONNECTED state and the second RRC_CONNECTED state for the first USIM both occur with a common cell of the first network.

Clause 13. The method of clause 4, further comprising:

performing a tune away at the user equipment from the first USIM to the second USIM prior to the receiving of the paging message.

Clause 14. The method of any of clauses 1-13, wherein the first network is a first Radio Access Network (RAN) and the second network is a second RAN.

Clause 15. A method of wireless communication for a multiple universal subscriber identity module (USIM) user equipment, comprising:

transmitting a suspension-triggering message to a first network while a first USIM in the user equipment operates in a first cell of the first network;

in response to the transmission of the suspension-triggering message, receiving a Release message to cause the first USIM in the user equipment to transition from a first RRC_CONNECTED state to an RRC_INACTIVE state;

in response to a transition of a second USIM in the user equipment from an RRC_CONNECTED state into an RRC_IDLE state with respect to a second network, performing a Radio Resource Control (RRC) Resume procedure between the first USIM and the first network that includes a contention-based random access of the first USIM to a second cell of the first network; and transitioning the first USIM from the RRC_IDLE state back into a second RRC_CONNECTED state with the first network responsive to a performance of the RRC Resume procedure.

Clause 16. The method of clause 15, wherein the suspension-triggering message comprises a UEAssistanceInformation message.

Clause 17. The method of clause 16, wherein the UEAssistanceInformation message includes an inactive field.

Clause 18. A method of wireless communication for a base station, comprising:

receiving a suspension-triggering message from a multiple universal subscriber identity module (USIM) user equipment;

in response to a receipt of the suspension-triggering message, transmitting a Release message to a first USIM in the user equipment to cause the first USIM to transition from a first RRC_CONNECTED state to an RRC_INACTIVE state, the Release message identifying a random-access preamble to the user equipment;

receiving the random-access preamble from the user equipment; and in response to the receiving of the random-access preamble, transmitting a Random Access Response to the first USIM to cause the first USIM to transition from the RRC_INACTIVE state to a second RRC_CONNECTED state.

Clause 19. The method of clause 18, wherein the suspension-triggering message comprises a UEAssistanceInformation message.

Clause 20. The method of clause 19, wherein the UEAssistanceInformation message includes an Inactive field.

Clause 21. The method of any of clauses 18, wherein the Release message comprises a SuspendConfig message.

Clause 22. The method of clause 21, wherein the SuspendConfig message includes a RACH-ConfigDedicated field for identifying the random-access preamble.

Clause 23. The method of any of clauses 18-22, wherein the Random Access Response includes an uplink grant for a buffer status request from the user equipment, the method further comprising:

receiving the buffer status request from the user equipment.

Clause 24. A user equipment, comprising:

a first universal subscriber identity module (USIM) configured to associate with a first network;

a second USIM configured to associate with a second network;

a transceiver; and a processor configured to:

command the transceiver to transmit a suspension-triggering message to the first network;

transition the first USIM from a first RRC_CONNECTED state in the first network to an RRC_INACTIVE state in response to a receipt at the transceiver of a Release message;

identify a random-access preamble from the Release message;

transition the second USIM in the user equipment from an RRC_CONNECTED in the second network into an RRC_IDLE state;

in response to the transition of the second USIM, command the transceiver to transmit the random-access preamble to the first network; and transition the first USIM from the RRC_INACTIVE state to a second RRC_CONNECTED state in the first network in response to a receipt at the transceiver of a Random Access Response from the first network.

Clause 25. The user equipment of clause 24, wherein the suspension-triggering message comprises a UEAssistanceInformation message.

Clause 26. The user equipment of clause 24, wherein the Release message comprises a Radio Resource Control (RRC) Release message.

Clause 27. The user equipment of clause 26, wherein the RRC Release message comprises a SuspendConfig message.

Clause 28. The user equipment of clause 27, wherein the SuspendConfig message includes a RACH-ConfigDedicated field for identifying the random-access preamble.

Clause 29. The user equipment of any of clause 24-28, wherein the Random Access Response includes an uplink grant for a buffer status request from the user equipment, the processor being further configured to command the transceiver to transmit the buffer status request to the first network.

Clause 30. The user equipment of clause 25, wherein the processor is further configured to command the transceiver to perform a tune away from the first network to the second network prior to the command of the transceiver to transmit a suspension-triggering message to the first network.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims.

What is claimed is:

1. A method of wireless communication for a multiple universal subscriber identity module (USIM) user equipment, comprising:

transmitting a suspension-triggering message to a first network;

in response to the transmission of the suspension-triggering message, receiving a Release message to cause a first USIM in the user equipment to transition from a first RRC_CONNECTED state to an RRC_INACTIVE state with the first network, wherein the Release message comprises an RRC SuspendConfig message including a RACH-ConfigDedicated field for identifying a random-access preamble to the user equipment;

transitioning a second USIM in the user equipment from an RRC_IDLE state to an RRC_CONNECTED state with a second network;

in response to a transition of the second USIM in the user equipment from the RRC_CONNECTED state back into the RRC_IDLE state with the second network, transmitting the random-access preamble to the first network to begin a contention-free random-access procedure with the first network; and in response to the transmission of the random-access preamble to the first network, receiving a Random Access Response to cause the first USIM to transition from the RRC_INACTIVE state to a second RRC_CONNECTED state with the first network to complete the contention-free random-access procedure with the first network.

2. The method of claim 1, wherein the suspension-triggering message comprises a UEAssistanceInformation message.

3. The method of claim 2, wherein the UEAssistanceInformation message includes an inactive field to alert the first network to transition the first USIM to the RRC_INACTIVE state.

4. The method of claim 1, further comprising:
receiving a paging message to the second USIM prior to the transmission of the suspension-triggering message.

5. The method of claim 4, wherein the paging message is a high-priority paging message.

6. The method of claim 4, further comprising:
while the second USIM is in the RRC_CONNECTED state, communicating with the second network in response to the paging message.

7. The method of claim 4, further comprising:
performing a tune away at the user equipment from the first USIM to the second USIM prior to the receiving of the paging message.

8. The method of claim 1, wherein the Random Access Response includes an uplink grant for a buffer status report from the user equipment, the method further comprising:
transmitting the buffer status report to the first network responsive to a transition of the first USIM from the RRC_INACTIVE state back to the second RRC_CONNECTED state.

9. The method of claim 8, wherein the transmitting the buffer status report to the first network comprises transmitting the buffer status report on a physical uplink shared channel.

10. The method of claim 1, wherein the first RRC_CONNECTED state and the second RRC_CONNECTED state for the first USIM both occur with a common cell of the first network.

11. The method of claim 1, wherein the first network is a first Radio Access Network (RAN) and the second network is a second RAN.

12. A method of wireless communication for a multiple universal subscriber identity module (USIM) user equipment, comprising:

transmitting a suspension-triggering message to a first network while a first USIM in the user equipment operates in a first cell of the first network;

in response to the transmission of the suspension-triggering message, receiving a Release message to cause the first USIM in the user equipment to transition from a first RRC_CONNECTED state to an RRC_INACTIVE state with the first network, the Release message identifying a random-access preamble to the user equipment, wherein the Release message comprises an RRC SuspendConfig message including a RACH-ConfigDedicated field for identifying the random-access preamble;

transitioning a second USIM in the user equipment from an RRC_IDLE state to the RRC_CONNECTED state with a second network;

in response to a transition of the second USIM in the user equipment from the RRC_CONNECTED state back into the RRC_IDLE state with the second network, performing a Radio Resource Control (RRC) Resume procedure between the first USIM and the first network that includes a contention-based random access of the first USIM to a second cell of the first network; and transitioning the first USIM from the RRC_INACTIVE state back into a second RRC_CONNECTED state with the first network responsive to a performance of the RRC Resume procedure.

13. The method of claim 12, wherein the suspension-triggering message comprises a UEAssistanceInformation message.

14. The method of claim 13, wherein the UEAssistanceInformation message includes an inactive field to alert the first network to transition the user equipment to the RRC_INACTIVE state.

15. A method of wireless communication for a base station, comprising:
 receiving a suspension-triggering message from a multiple universal subscriber identity module (USIM) user equipment;
 in response to the receiving of the suspension-triggering message, transmitting a Release message to a first USIM in the user equipment to cause the first USIM to transition from a first RRC_CONNECTED state to an RRC_INACTIVE state, wherein the Release message comprises an RRC SuspendConfig message including a RACH-ConfigDedicated field for identifying a random-access preamble to the user equipment;
 receiving the random-access preamble from the user equipment responsive to transition of a second USIM back to the RRC_IDLE state with a second network to begin a contention-free random-access procedure with a first network; and
 in response to the receiving of the random-access preamble, transmitting a Random Access Response to the first USIM to cause the first USIM to transition from the RRC_INACTIVE state to a second RRC_CONNECTED state with the first network to complete the contention-free random-access procedure with the first network.

16. The method of claim 15, wherein the suspension-triggering message comprises a UEAssistanceInformation message.

17. The method of claim 16, wherein the UEAssistanceInformation message includes an inactive field to alert the first network to transition the first USIM to the RRC_INACTIVE state.

18. The method of claim 15, wherein the Random Access Response includes an uplink grant for a buffer status report from the user equipment, the method further comprising:
 receiving the buffer status report from the user equipment.

19. A user equipment, comprising:
 a first universal subscriber identity module (USIM) configured to associate with a first network;
 a second USIM configured to associate with a second network;
 a transceiver; and
 a processor configured to:
 command the transceiver to transmit a suspension-triggering message to the first network;
 transition the first USIM from a first RRC_CONNECTED state to an RRC_INACTIVE state with the first network in response to a receipt at the transceiver of a Release message, wherein the Release message comprises an RRC SuspendConfig message including a RACH-ConfigDedicated field for identifying a random-access preamble to the user equipment;
 transition the second USIM from an RRC_IDLE state to the RRC_CONNECTED state with the second network;
 transition the second USIM from the RRC_CONNECTED state back into the RRC_IDLE state with the second network;
 in response to the transition of the second USIM back into the RRC_IDLE state, command the transceiver to transmit the random-access preamble to the first network to begin a contention-free random-access procedure with the first network; and
 transition the first USIM from the RRC_INACTIVE state back to a second RRC_CONNECTED state in the first network in response to a receipt at the transceiver of a Random Access Response from the first network to complete the contention-free random-access procedure with the first network.

20. The user equipment of claim 19, wherein the suspension-triggering message comprises a UEAssistanceInformation message.

21. The user equipment of claim 20, wherein the processor is further configured to command the transceiver to perform a tune away from the first network to the second network prior to the command of the transceiver to transmit the suspension-triggering message to the first network.

22. The user equipment of claim 19, wherein the Release message comprises a Radio Resource Control (RRC) Release message.

23. The user equipment of claim 19, wherein the Random Access Response includes an uplink grant for a buffer status report from the user equipment, the processor being further configured to command the transceiver to transmit the buffer status report to the first network.

* * * * *